US009519643B1

(12) United States Patent
Nakagiri et al.

(10) Patent No.: US 9,519,643 B1
(45) Date of Patent: Dec. 13, 2016

(54) MACHINE MAP LABEL TRANSLATION

(71) Applicant: Microsoft Technology Licensing, LLC, Redmond, WA (US)

(72) Inventors: Hiroshi Nakagiri, Tokyo (JP); Tetsuaki Otsuki, Tokyo (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 14/740,120

(22) Filed: Jun. 15, 2015

(51) Int. Cl.
G06F 17/28 (2006.01)
G06F 17/20 (2006.01)
G06F 17/27 (2006.01)

(52) U.S. Cl.
CPC ......... *G06F 17/289* (2013.01); *G06F 17/2775* (2013.01)

(58) Field of Classification Search
CPC .............. G06K 9/6256; G06T 11/60; G06T 2207/10088; G06T 2207/20081; G06T 2207/20192; G06T 2207/30016; G06T 2207/30096; G06T 7/0012; G06T 7/0081; G06T 7/0087; A61B 5/055; A61B 5/4076; A61B 5/4878; G01C 21/32; G06F 17/289; G06F 17/30241; G09B 29/007
USPC ....... 704/3, 1, 8, E15.003; 706/12; 345/419; 715/700
See application file for complete search history.

(56) References Cited

U.S. PATENT DOCUMENTS

| 5,768,603 | A | 6/1998 | Brown et al. |
| 7,536,295 | B2 | 5/2009 | Cancedda et al. |
| 8,274,506 | B1 * | 9/2012 | Rees ........................ G06T 15/04 345/419 |
| 8,364,462 | B2 | 1/2013 | Joy et al. |
| 8,612,203 | B2 | 12/2013 | Foster et al. |
| 8,731,901 | B2 | 5/2014 | Srihari et al. |

(Continued)

FOREIGN PATENT DOCUMENTS

WO   2007068123 A1   6/2007

OTHER PUBLICATIONS

Keefer, Jordan S., "Improving Statistical Machine Translation through N-Best List Re-Ranking and Optimization", In Thesis, Mar. 2014, 89 pages.

(Continued)

*Primary Examiner* — Charlotte M Baker
(74) *Attorney, Agent, or Firm* — Dan Choi; Judy Yee; Micky Minhas

(57) ABSTRACT

Map label translation implementations described herein transliterate and translate map labels in a first language, even those written in a non-Latin script, into a Latin script and into a second language. In some implementations a translation candidate generator process generates possible translation candidate sequences for each n-gram in the map label, for example, an entity's name in Japanese and possibly in native Japanese (non-Latin, non-Roman) script. A candidate sequence selector selects a number of top possible translation candidate sequences. A ranking feature extraction process is used to rank the selected top number of top possible translation candidate sequences by using a trained probabilistic classifier and geospatial and linguistic context information as ranking features. A post ranker then re-ranks the selected ranked translation candidates depending on neighboring proximity information around the location of the entity and outputs the best map label translation in the second language.

20 Claims, 8 Drawing Sheets

(56) References Cited

U.S. PATENT DOCUMENTS

| | | | |
|---|---|---|---|
| 8,990,128 B2* | 3/2015 | He | G06K 9/628 |
| | | | 706/12 |
| 9,122,943 B1* | 9/2015 | Muszynski | G06K 9/033 |
| 2003/0233222 A1 | 12/2003 | Soricut et al. | |
| 2006/0074987 A1* | 4/2006 | Bitsch | G06F 17/30985 |
| 2007/0239423 A1 | 10/2007 | Miller | |
| 2008/0114583 A1 | 5/2008 | Al-Onaizan | |
| 2008/0319990 A1 | 12/2008 | Taranenko et al. | |
| 2010/0023315 A1 | 1/2010 | Quirk | |
| 2010/0082330 A1* | 4/2010 | Ankur | G01C 21/32 |
| | | | 704/8 |
| 2012/0209587 A1 | 8/2012 | Tanaka et al. | |
| 2012/0265518 A1 | 10/2012 | Lauder | |
| 2012/0316862 A1 | 12/2012 | Sultan et al. | |

OTHER PUBLICATIONS

Ahmed, F. et al., Arabic/English word translation disambiguation approach based on naive Bayesian classifier, Int'l Conf. on Comp. Science and Info. Tech., Oct. 20, 2008, pp. 331-338.

Al-Onaizan, Y., et al., Translating named entities using monolingual and bilingual resources, Proc. of the Annual Meeting of the Association for Computational Linguistics, Jul. 6, 2002, pp. 400-408.

Bird, S. et al., Learning to Classify Text, Natural Language Processing with Python, Jun. 11, 2015.

Hermjakob, U., et al., Name translation in statistical machine translation learning when to transliterate, Proc. of ACL 2008, Jun. 2008, pp. 389-397.

International Search Report and Written Opinion, PCT/US2016/037295, Sep. 8, 2016, pp. 1-14.

* cited by examiner

MACHINE MAP LABEL TRANSLATION

BACKGROUND

In general, maps of a city, state or country are usually labeled in the language of the location they represent. Often the map labels are also in a native non-Latin script. Map labels can be manually translated from a first language in a non-Latin script to a second language. In order to do so it is often necessary to transliterate the map label from a native, non-Latin script into a phonetic representation in a Latin script. This can be labor intensive and as a result, map providers do not translate labels on the maps they produce, even those designed for use by tourists. For example, Japanese map providers provide map labels in Japanese, often in a native Japanese script. Some do provide versions of maps that have Romanized names or Latin names, but the coverage of entities in these maps is only 30% of all map labels depicted on a Japanese map of the same geographic area. Without a map with labels translated into a Roman script and into a global language, visitors have difficulty finding their way around.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, the map label translation implementations described herein translate map labels in a first language, even those written in a non-Latin script, into a second language in Latin script. To this end, in some implementations, a translation candidate generator generates possible translation candidate sequences for each n-gram in a map label in a first language that is to be translated into a second language. For example, the map label can be the entity's name in Japanese and possibly in native Japanese script (non-Latin, non-Roman, such as, for example, Kanji). A candidate sequence selector then selects a number of these translation candidate sequences for further processing. A ranking feature extraction process is used to extract features based on geospatial and linguistic context from the map label and the selected translation candidate sequences. The features are used to rank the selected translation candidate sequences using a probabilistic classifier trained at least in part with the same features. A post ranker then re-ranks the ranked translation candidates output by the probabilistic classifier based on the labeling of neighboring entities in proximity to the location of the entity represented by the map label. The best translation for the input map label in the second language is then output.

The map label translation implementations described herein are advantageous in that they are capable of providing transliterations and translations of map labels using geographical context, give appropriate abbreviations, suffixes or prefixes to translated map labels, and make a reliable translation prediction when there is no truth data as to what the translation for the map label should be. Furthermore, many map label translations can be performed in a short period of time, especially when compared to manual translation. This is especially true when the translation requires transliteration of a native script into a Roman and Latin script.

DESCRIPTION OF THE DRAWINGS

The specific features, aspects, and advantages of the disclosure will become better understood with regard to the following description, appended claims, and accompanying drawings where:

DETAILED DESCRIPTION

In the following description of map label translation implementations, reference is made to the accompanying drawings, which form a part thereof, and which show by way of illustration examples by which implementations described herein may be practiced. It is to be understood that other embodiments may be utilized and structural changes may be made without departing from the scope of the claimed subject matter.

1.0 Map Labeltranslation Implementations

The following sections provide an introduction and overview of the map label translation implementations described herein, as well as exemplary processes and a system for practicing these implementations. Details of various embodiments and exemplary computations are also provided.

As a preliminary matter, some of the figures that follow describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The map label translation implementations described herein are advantageous in that they are capable of providing transliterations and translations of map labels using geographical context with a probabilistic classifier to give appropriate abbreviations, suffixes or prefixes to translated map labels, and make a reliable translation prediction when there is no truth data as to what the translation for the map label should be. Furthermore, many map label translations can be performed in a short period of time, especially when compared to manual translation because the probabilistic classifier can process large amounts of data in a relatively short time. This is especially true when the translation requires transliteration of a native script into a Roman and Latin script.

Figure 1:
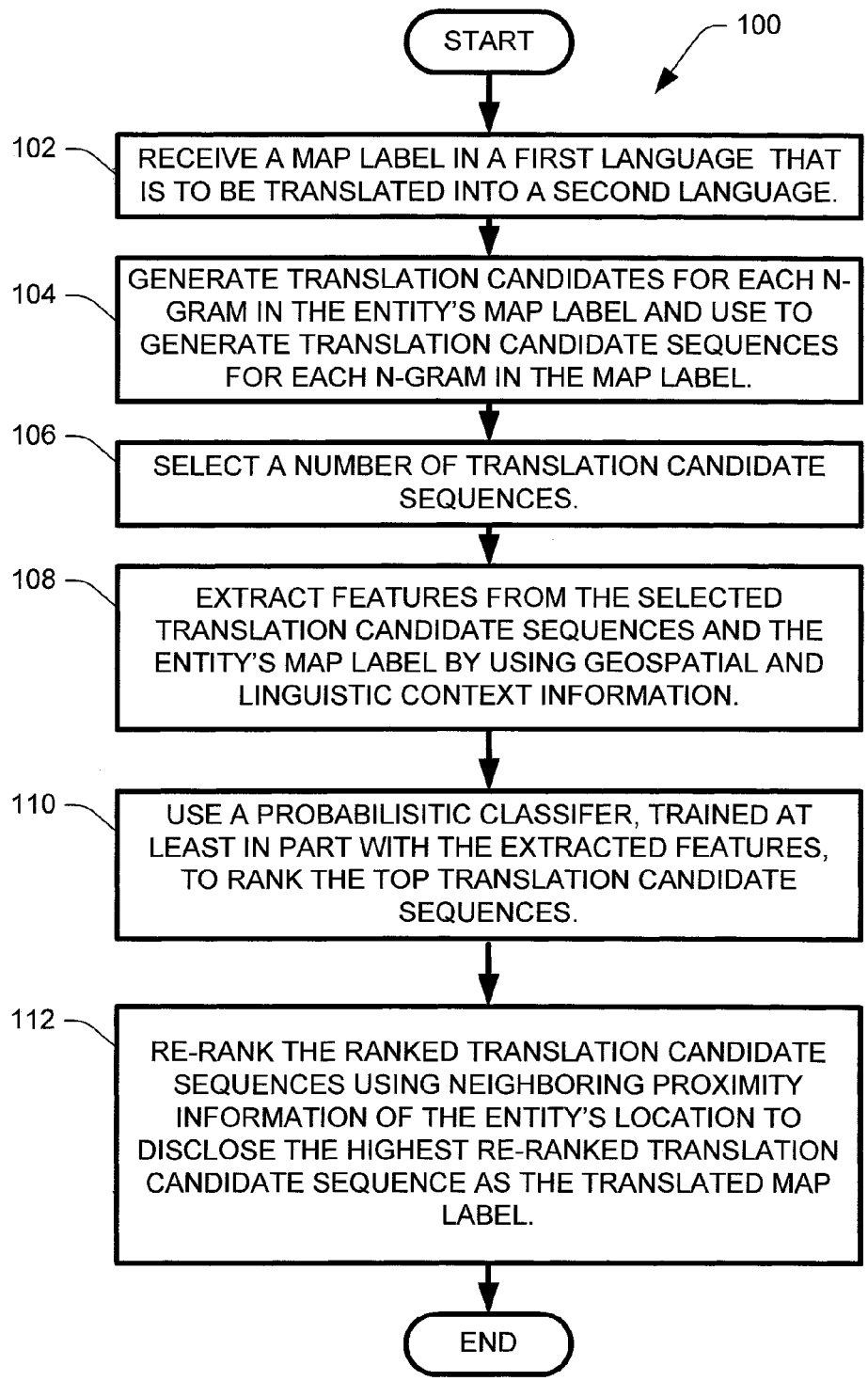
FIG. 1 is a functional block diagram of an exemplary process for translating map labels according to one map label translation implementation described herein.

FIG. 1 depicts an exemplary process 100 for translating map labels (e.g., from a first (e.g., local) language and possibly a local non-Latin script) into a second (e.g., global) language and a Latin script. For purposes of the following description, and the rest of the specification, the first language is Japanese and the second language is English. However, those with ordinary skill in the art will realize that a different first language and a different second language can be used. Because the following description relates to an example of translating Japanese map labels into English, the following paragraphs provide some detail regarding the Japanese language and how it can be transliterated and translated.

Japanese is a complex language consisting of three different types of native script character sets (Kanji, Hiragana and Katakana). A fourth character set, which is a Latin script (known as Romaji in Japanese), or the Romanization of Japanese names, is also used. Moreover, how a Romanized name is spelled has many variations and introduces an additional complexity.

One aspect of translating Japanese local entities is the phonetic ambiguity of Kanji. The phonetic of a Kanji word can change depending on the location, or the entity the word represents. For example, the Japanese word 新宿 can be read as 'Shinjyuku' (which is a ward in Tokyo prefecture), but it can also be read as 'Arajyuku' (the name of a town in Ibaragi Prefecture), or even 'Niijyuku' (the name of a neighborhood). There could even be other possibilities.

Map label translation is also non-trivial when it comes to abbreviations. Since a label occludes the map, ideally one needs abbreviations for languages that tend to occupy more space than others. For example, 荒川 (Arakawa) is the Japanese term for the Arakawa River. One can notice immediately that "Arakawa River" is longer than 荒川. Since map readability is highly dependent on the reduction of label cluttering, one can abbreviate River to be Riv., making it Arakawa Riv. Additionally, Arakawa by itself contains the nuance of river (kawa=river), so the map label can be reasonably abbreviated to Ara Riv. Japan's Ministry of Land, Infrastructure, Transport and Tourism, however, has unanimously agreed that Ara. Riv. is a special case that must be denoted in its fuller form as Arakawa Riv. This does not apply to the abbreviations for other rivers though, such as Kandagawa (which can be abbreviated as Kanda Riv.)

Additionally, suffixes and prefixes can be trans-positioned depending on the entity type. For example, Riv. is a suffix but Mt. (Mountain) is a prefix. In Japanese both Riv. (川) and Mt. (山) are suffixes.

When dealing with the names of local entities in Japanese (such as the name of a restaurant or a building), not all local entities have a translation at all, so it is difficult to find the true translation in the first place.

Referring again to FIG. 1, map label translation implementations described herein use the following exemplary process 100 to translate a map label in a first language into a second language. As shown in block 102, an entity's map label in a first language that is to be translated into a second language is received. If the map label has no pair data (e.g., the label has no Latin equivalent in the second language), translation candidates are generated for it. To this end, as shown in block 104, translation candidates in the second language are generated for each n-gram in the map label in the first language. Each n-gram is a contiguous sequence of items from a given sequence of text or speech (e.g., phoenemes, syllables, letters, words, etc.). These translation candidates are used to generate translation candidate sequences (e.g., by using combinations of translated terms for each n-gram in the map label in the first language).

As shown in block 106, a number of the generated translation candidate sequences are then selected by performing an interim ranking. For example, the number of the selected translation candidate sequences can be a prescribed number, for example the top two or three. In some map label translation implementations this interim ranking is done by using a conventional Viterbi algorithm that finds the most likely translation candidate sequence(s) given the input map label. For a given translation candidate sequence, the Viterbi algorithm uses the transition probabilities between terms in the given translation candidate sequence. The transition probabilities between terms are pre-calculated. Details of how transition probabilities can be pre-computed are provided in Section 2.3 and 2.3.1.

As shown in block 108, features are extracted from the map label and the number of selected translation candidate sequences by using geospatial and linguistic context information. This context information can include, for example, location, character type, geographical coordinates, proximity information, linguistic features, and so forth.

Using the extracted features, as shown in block 110, the selected translation candidate sequences are then ranked using a probabilistic classifier trained at least in part with the features of the same type as the extracted features.

As shown in block 112, the ranked translation candidate sequences received from the probabilistic classifier are then re-ranked or post-ranked using information about entities neighboring the location corresponding to the map label. In some implementations, the translation candidate sequences are re-ranked to align with the labeling or numbering of neighboring buildings or entities. The highest re-ranked translation candidate sequence is output as the translated map label (e.g., in the second language and Roman script).

Figure 2:
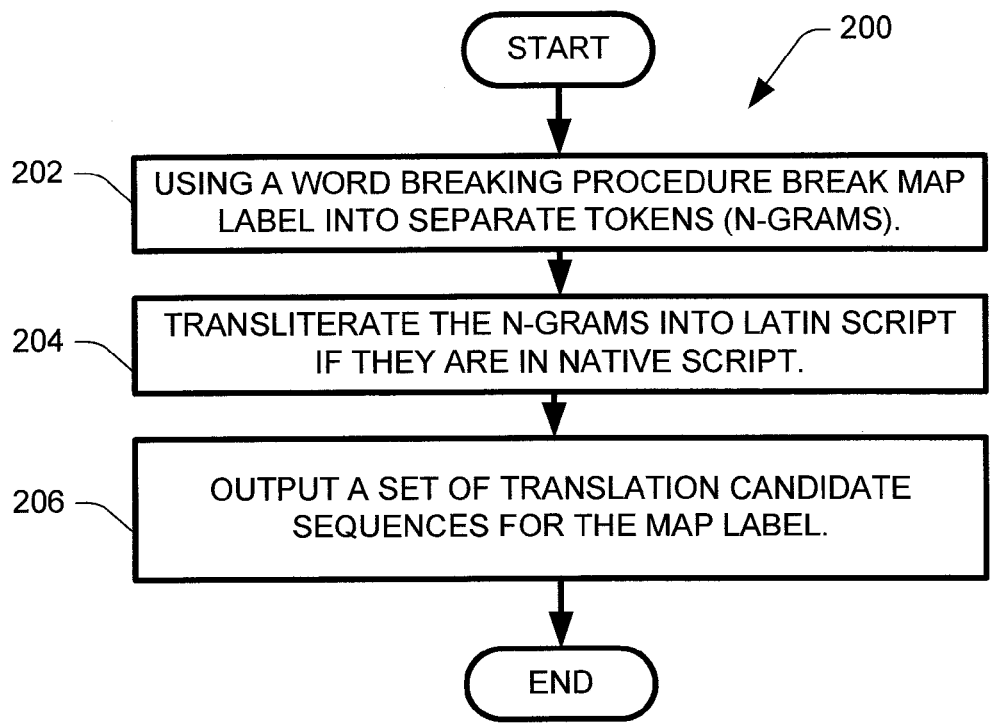
FIG. 2 is a functional block diagram of an exemplary process for generating translation candidate sequences for each n-gram in an entity's map label.

FIG. 2 depicts an exemplary process 200 for generating the possible translation candidate sequences from the n-gram in the entity's name. This process generates Latin equivalents for the map labels in a native script in the first language that have no Latin equivalent in the second language. As shown in block 202, using a conventional word breaker, a given map label in a first language (e.g., Japanese) is broken into separate tokens (n-grams). Although English is already tokenized using spaces, Japanese and other eastern Asian languages do not use spaces. In this exemplary process 200, the word breaker breaks the map label into its constituent parts and provides the part of speech (category of speech, such a proper noun, place name, noun) for each of these constituent parts. (This part of speech label can be used later as a feature in ranking.)

The n-grams in Japanese script (e.g., Kanji, Romaji, etc.) are then transliterated into Latin script if the entity's map label is not already in Latin script, as shown in block 204. (Transliteration is the conversion of text from one script or alphabet to another.) A transliteration engine, such as, for example, a Yomi Predictor model or a Romani mapper can be used to transliterate the n-grams into Latin script. A white list (a list that has approved translations for a given transliterated Japanese term or n-gram) can be used to translate the transliterated n-grams into Latin script and/or the second language. Various sources can be used to generate the white list of paired data (e.g., Japanese-English) for given terms. Other methods of obtaining translations include obtaining them from common sources of translation that include, for example, pre-globalized map data from a data provider that provides both Japanese and Latin equivalents for the same entity, entities from Wikipedia that contain the name of the entity in both Japanese and a Latinized form, or existing machine translation results. The translated n-grams are then combined to create translation candidate sequences, as shown in block 206.

Figure 3:
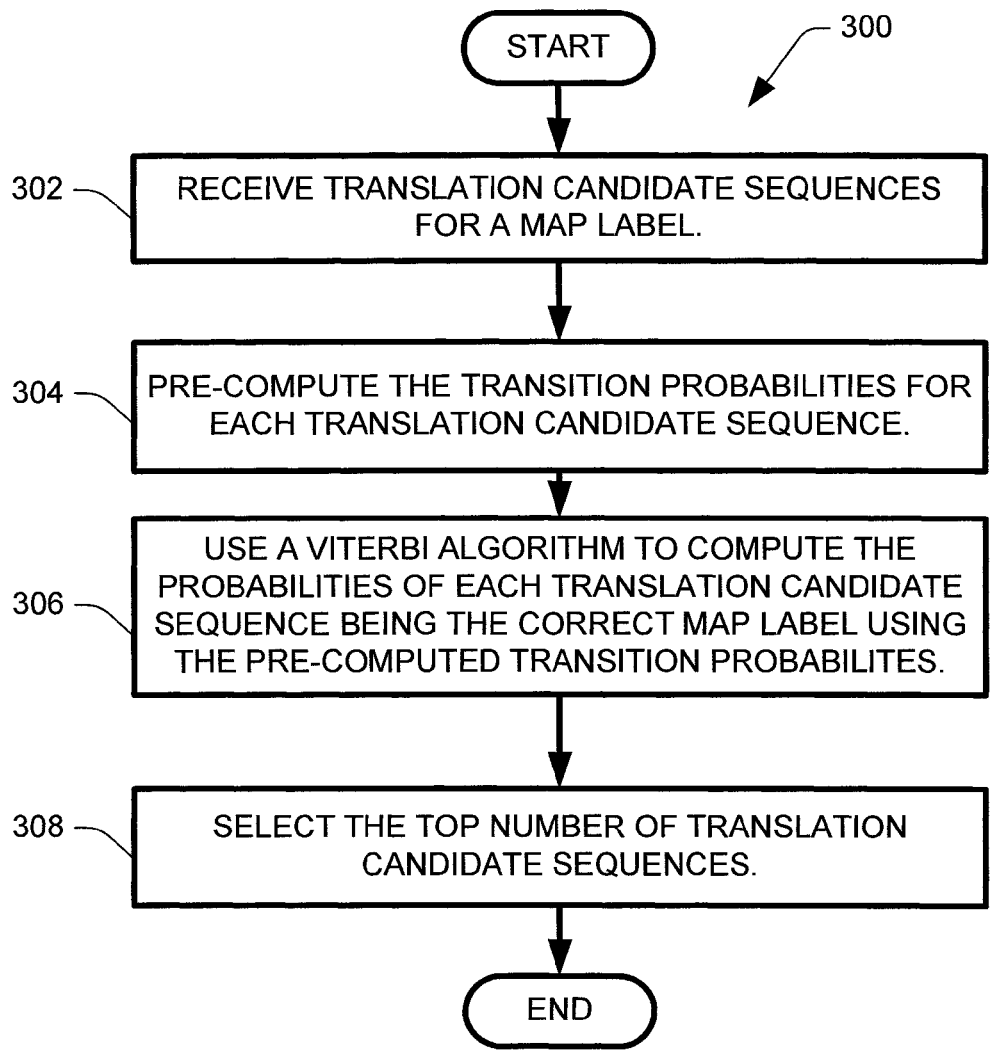
FIG. 3 is a functional block diagram of an exemplary process that selects a given number of top translation candidate sequences.

FIG. 3 depicts an exemplary process 300 for selecting a given number of the top translation candidate sequences (e.g., for further processing). One implementation of this process uses a conventional Viterbi algorithm to compute the most likely state sequence in a Hidden Markov Model (HMM) given a set of observed inputs. In this case, the hidden states are the various translation candidate sequences generated (for example, using the process 200 of FIG. 2). The Viterbi algorithm uses the transition probability of each possible translation candidate sequence to output an interim ranking of the translation candidate sequences. In some implementations, a higher transition probability of a translation candidate sequence indicates that it more likely to be a better translation of the input map label (e.g. in the second language) as compared to a translation candidate sequence with a lower probability. As shown in block 302, the set of possible translation candidate sequences for an entity's map label are received. The transition probabilities of a translation candidate sequence are pre-calculated, as shown in block 304. For example, the transition probabilities between terms can be calculated by using the method by which an n-gram or a translation candidate sequence is generated. For example, if a translation of an n-gram in the input map label was found in a white list during the candidate generation it will have a very high transition probability (e.g., 0.9). As shown in block 306, the transition probability of each translation candidate sequence is determined. The transition probabilities can be used as a score to rank the translation candidate sequences. The highest ranking translation candidate sequences are then selected for further processing as described below.

Figure 4:
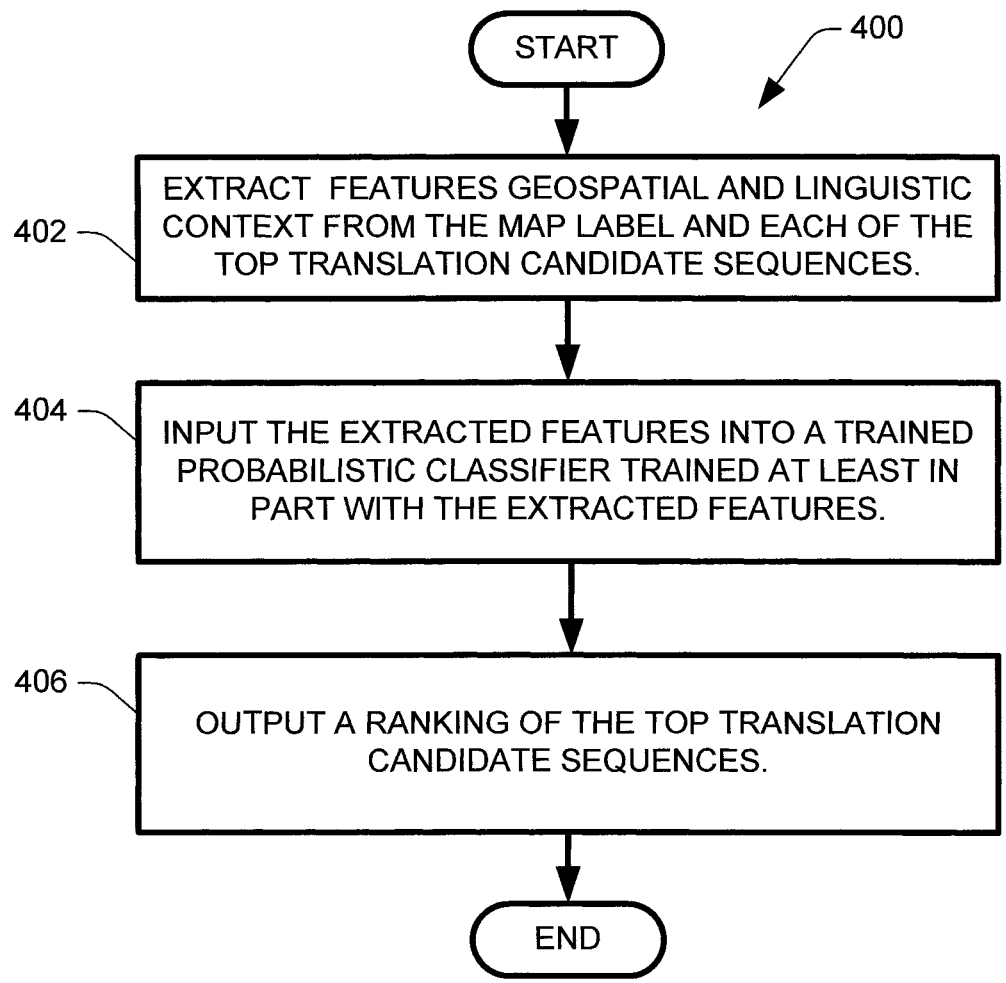
FIG. 4 is functional block diagram of an exemplary process that ranks the selected translation candidate sequences using a probabilistic classifier and geo-spatial and context information as ranking features.

FIG. 4 depicts an exemplary process 400 for ranking the selected translation candidate sequences determined with respect to FIG. 3 using geo-spatial and linguistic context information as ranking features. To this end, as shown in block 402, geospatial and linguistic context features are extracted from each of the selected translation candidate sequences and from the input map label. For example, these context features can include the context of the administrative or unofficial region in which the entity corresponding to the map label lies, whether or not the entity is a prominent landmark or business, whether the entity falls into a well known category of entity (e.g., school, office, police station, fire station, court, library, museum, aquarium, zoo, amusement park, gymnasium, field, pool, and so forth), whether the entity contains a nature n-gram (e.g., river, mountain), whether it is a entrance, whether it is a company name, whether it contains a Kanji n-gram, the number of Hiragana n-grams it contains, the number of Romaji candidates it contains, its proximity to a surrounding building pattern, or whether it contains an n-gram that is absolutely defined. The features are then input into a conventional probabilistic classifier trained at least in part using the same types of features, as shown in block 404. The output of the probabilistic classifier is then deemed to be a ranking of the selected translation candidate sequences for the input map label, as shown in block 406.

Figure 5:
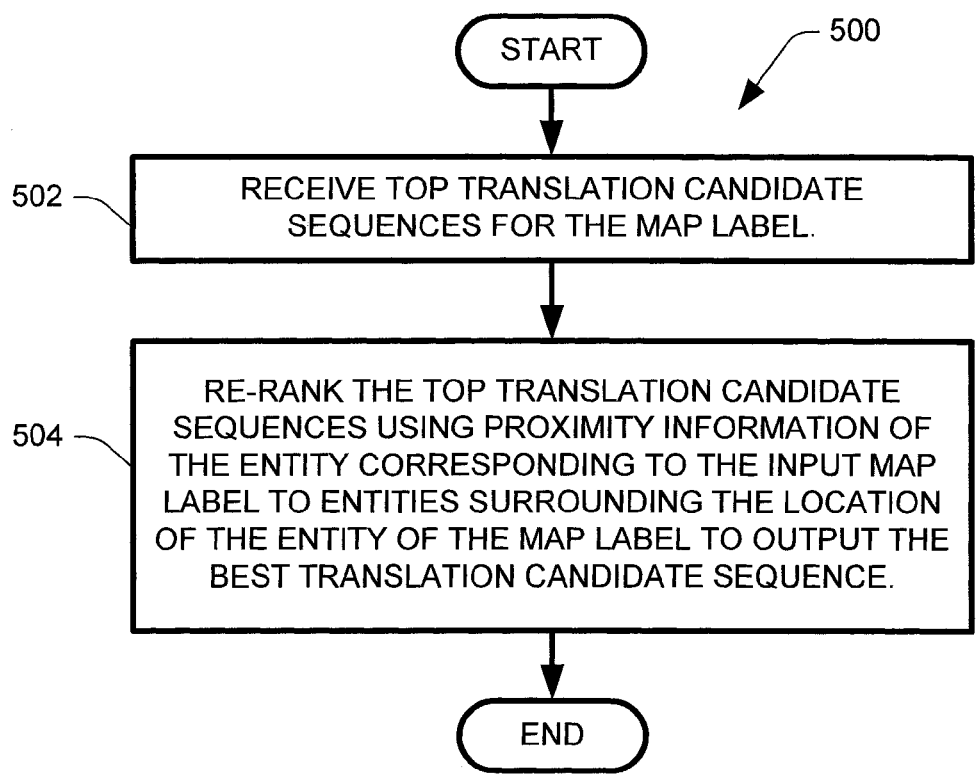
FIG. 5 is a functional block diagram of an exemplary post ranking process that re-ranks the ranked translation candidate sequences using neighboring proximity information.

FIG. 5 depicts an exemplary process 500 for re-ranking or post-ranking the ranked translation candidate sequences output by the probabilistic classifier depending on neighboring proximity information. To this end, in one implementation, the translation candidate sequences selected in process 400 described above with respect to FIG. 4 are re-ranked using proximity information of the entity corresponding to the input map label to entities surrounding the location of the entity represented by the map label (e.g., without using the probabilistic classifier). As shown in block 502, the ranked translation candidate sequences are received. The ranked list of top translation candidate sequences are then re-ranked (e.g., in real-time) using proximity information, as described in greater detail below. For example, this can be done by using a similar numbering sequence of neighboring buildings around the entity corresponding to the input map label to post-rank the list of top translation candidate sequences for the map label. Furthermore, the proximity to a surrounding building pattern can be used to re-rank the list of top translation candidate sequences. Additionally, a list of terms that are not allowed to be mistranslated can be used to post-rank the top translation candidate sequences.

Figure 6:
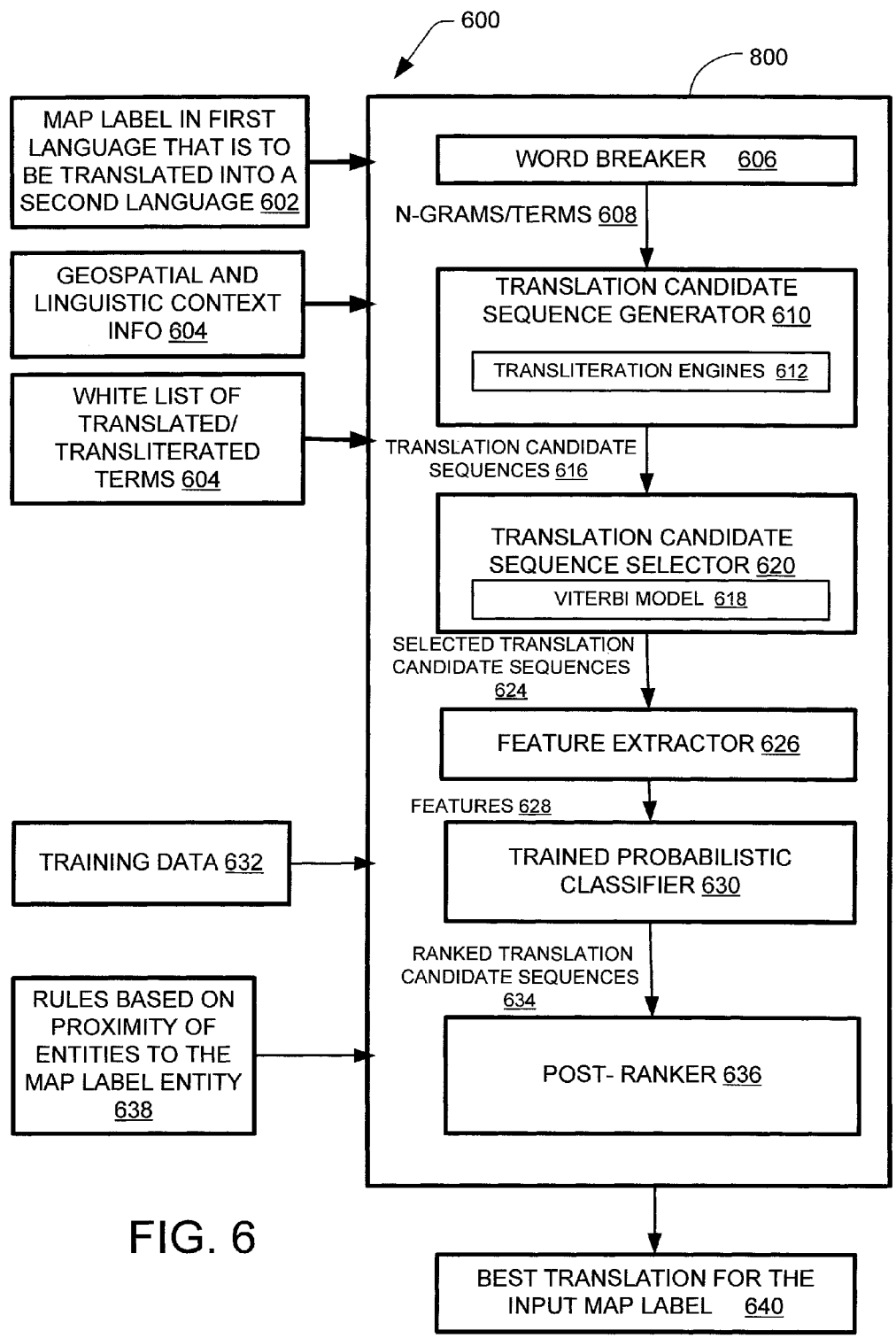
FIG. 6 is an exemplary system diagram of a system for translating a map label from a first language in non-Latin script into a second language into a second language in Latin script.

FIG. 6 depicts an exemplary system 600 for practicing various map label translation implementations as described herein. The system employs a computing device 800 such as will be described in greater detail with respect to FIG. 8. A map label in a first language and a non-Roman script is transliterated and translated to provide a map label in a Latin script and a second language. To this end, an entity's map label 602 and its associated geospatial data 604 is received. A word breaker 606 parses the received map label 602 into a number of n-grams or terms 608. A translation candidate generator 610 generates possible translations for each of the n-grams 608. Each n-gram 608 can have multiple possible translations. In some cases it may be necessary to transliterate one or more of the n-grams 608 from a native script (non-Latin script such as Kanji) to a Latin script by using one or more transliterations engines 612. For example, the input map label can have an entity's name in Japanese and possibly in native Japanese script (e.g., non-Latin, non-Roman such as Kanji) and n-grams of this map label can be transliterated and translated into a Latin or Roman script in a second language (such as English).

The translation candidate generator 610 then generates possible translation candidate sequences 616 by combining translations for each n-gram in the map label.

A candidate sequence selector 620 selects a number translation candidate sequences 622 generated by the translation candidate generator 610 by using the transition probability (e.g., ranking score) of each translation candidate sequence and selecting a given number of these based on their score (translation candidate sequences with higher transition probabilities being ranked higher). The translation candidate selector 620 can employ a Viterbi model 618 to rank the translation candidate sequences. The translation candidate sequences are each defined by transition probabilities output by the Viterbi model. The transition probabilities can be based on pre-computed probabilities for the probability of transition between the transliterated terms of a given translation candidate sequence. Exemplary computations are provided in Section 2.3. A number of translation candidate sequences 624 are selected by the translation candidate sequence selector 620 for further processing based on their transition probability (the higher the transition probability the higher they are ranked for selection).

A ranking feature extractor 626 is used to extract features 628 from the map label 602 and the selected number of translation candidate sequences 624 by using geospatial and linguistic context information 604 as ranking features 628 (which can consist of location, character type, etc.). The features 628 are then input into a probabilistic classifier 630 that is trained at least in part with training data 632 comprising similar features 628. The probabilistic classifier 630 then ranks the selected translation candidate sequences using the features 628.

A post processor 628 then re-ranks the ranked translation candidate sequences received from the probabilistic classifier 630 depending on neighboring proximity information 604 around the location of the entity corresponding to the input map label 602. Different rules 638 based on the proximity of entities surrounding the entity corresponding to the map label 602 can be used to re-rank the translation candidate sequences. The highest ranked translation candidate sequence is then output as the best translation 640 for the input map label 602.

2.0 Details and Exemplary Computations

The following paragraphs provide details and exemplary computations for practicing various map label translation implementations.

2.1 Overview

Map label translation implementations described herein make an international friendly map by translating map labels in a first language into a second language. These implementations can translate the map labels even if the first and second languages use different scripts. Map label translation implementations as described herein meticulously deal with high demand and high visibility areas of a map and provide a user friendly Latin name to each map entity.

For purposes of the following description, a first language of Japanese and a second language of English are presumed. However, those with ordinary skill in the art will know that the map label translation implementations described herein can be applied to various input and output languages and scripts. For example, the first language could be languages such as Korean, Chinese, Arabic, Hindi, or other language written in their native (non-Roman) scripts, and the second language could be English, French, German, Portuguese or any other language written in a Latin script.

Some map label translation implementations described herein use a loose form of Hepburn spelling to transliterate native Japanese script into Latin/Roman script. For example, えりも町 transliterates to erimochou or erimocho in Hepburn spelling. Furthermore, map label translation implementations described herein can use various available translation techniques such as Wikipedia translation where possible. Implementations aim for delimiting input map labels by spaces/dashes—for example, 富士見町三丁目 is broken into n-grams comprising Fujimi-machi 3 cyoume. Implementations also determine suffix or prefix placement depending on context (e.g., Arakawa Riv., but Mt. Fuji). Nuances that are repeated as a result of translation are typically ignored (e.g., 二重橋 as Nijyuubashi Bridge is considered a good translation, but not Nijyuu Bridge). Additionally, names originally in the second language are not converted.

In some implementations an entity's map label in a first language that is to be translated into a second language is received. For an entity whose map label has no pair data (e.g., the label on the map has no Latin equivalent in the second language), translation candidate sequences are generated for this map label by using combinations of n-grams derived from the entity's map label. A number of the translation candidate sequences are then selected by performing an interim ranking of them. For example, the number of selected translation candidate sequences can be a prescribed number, for example the top three. In some implementations this interim ranking is done by using a conventional Viterbi algorithm. For a given translation candidate sequence, the Viterbi algorithm uses the transition probabilities between terms (e.g., n-grams) in the given translation candidate sequence. The transition probabilities between terms are pre-calculated for example by looking at the source from which the terms of the translation candidate sequences are derived. Features are extracted from the entity's map label and the number of generated top translation candidate sequences by using geospatial and linguistic context information. This context information can include, for example, location character type, and so forth. Using the extracted features, the selected possible translation candidate sequences are then ranked by inputting them into a probabilistic classifier trained at least in part with the same features. The ranked translation candidate sequences are then post-ranked using neighboring proximity information to output the best (e.g., highest ranked) translation for the input map label. The following paragraphs provide details for each of these steps used in various map label translation implementations described herein.

2.2 Translation N-Gram Candidate Generator Method for Each N-Gram (e.g., in a Japanese Name).

In some map label translation implementations the map label in the first language (e.g., Japanese script) must be tokenized in order to transliterate the words written in Japanese script into Latin script. Although English is already naturally tokenized using spaces, Japanese and other east Asian languages are not because they do not use spaces between words. To this end, for map labels which have no Latin equivalent, translation candidate sequences are generated for them. For example, a conventional word breaker that breaks Japanese words into separate tokens (n-grams) is used to break each Japanese map label into its constituent parts and its part of speech (category of words). For example, given the Japanese script below (which represents Hilton Shinjyuku Hotel), the word breaker breaks the script into n-grams and their associated parts of speech:

ヒルトン新宿ホテル =>{ヒルトン}(proper noun), {新宿} (place name), {ホテル}(noun)

In some map label translation implementations a conventional Yomi-Predictor that uses a Yomi Predictor model is used to transliterate the n-grams. These implementations first convert a map label in Kanji to its most probable readable phonetic form in Kana. (The Yomi Predictor model is a machine trained model of past inputs of Kanji/Kana transliterations to get the highest probability in a Kanji to Kana transliteration problem using Bayes rule.) Then a conventional Romaji Converter is used that transliterates the phonetic Kana form for each constituent part, into Latin script using a Romaji mapper (example given below). For each constituent part, the Romaji Converter may use a transliteration white list to prevent proper nouns from becoming inappropriate transliterations (an example of a bad transliteration would be ヒルトン as Hiruton instead of Hilton, the universally recognized spelling of Hilton). For example, a Romaji mapper maps あ to la, あ to xa, あ to a, and い to li. There are also many known cases of having Latin mixed with Japanese. In these cases, the Latin part becomes a constituent part. The transliterated n-grams are then translated. For example, they can be translated using a white list, by using a machine translator, by using a dictionary of by using other conventional means of translation. Existing sources may be chosen to get a white list of possible candidates (utilizing the English-Japanese example). There may also be an additional option of digital curation (e.g., web crawling) of data sources. Data sources can include pre-globalized map data from a data provider which contains both Japanese and Latin equivalents for the same entity; entities from Wikipedia that have the page that contains the name of the entities in both the Japanese-Latinized form; and existing machine translation results.

For example, for the input map label of ヒルトン新宿ホテル discussed in the example above (which represents Hilton Shinjyuku Hotel), the results of the candidate generation can be something like the following (where each column represents a possible translation of an n-gram of the input map label:
Hiruton Arajyuku Hoteru
Hilton Shinjyuku Hotel
  Niijyuku
  Shinshuku
  New Inn 2.3 Translation Candidate Sequence Selection Translation candidate sequence selection in some implementations involves a conventional Viterbi algorithm or model to compute the most likely state sequence in a HMM given a set of observed outputs. In this case, the hidden states are the various translation candidate sequences that have been generated. Probabilities for components of the translation candidate sequences are pre-calculated. In one implementation, for a first language of Japanese and a second language of English, two probabilities, a first language (e.g., Japanese)-Romanization translation probability (e.g., (P(jaToken(i)→enToken(i)) and the translated n-gram sequential probability (e.g., P(enToken(I−1)→enToken(i)) are obtained. These two probabilities are then multiplied to compute the resulting transition probability for a given translation candidate sequence (e.g., P(Transition(i−1, i))=P (jaToken(i)→enToken(i))*P(enToken(I−1)→enToken(i)).

Each of these probabilities can be calculated in a manner of ways. Below is one exemplary way to calculate them.

In one implementation, P(jaToken(i)→enToken(i)) is calculated statistically, based on frequency that an n-gram or token (TokenA) in Language 1 (e.g., Japanese) is translated into other n-grams or tokens (TokenB0, TokenB1, TokenB2, . . . ) in Language 2 (e.g., English) in a set of data, such as, for example, a training corpus.

For example, in one implementation, if a token is found in a white list that contains a known translation for a given token or n-gram in the first language (e.g., Japanese), the probability is set to a fixed value of x, where x can be value that is configurable, but is generally given a high probability such as x=0.9. Else, if more than one translation is found to be in the white list for a given n-gram, the probability can be further adjusted. For example, a term or n-gram that occurs at a higher frequency is given the highest probability and the next highest occurring term is given the next highest probability. In some implementations the exact gap between each probability is normalized according to the number of possible translations found in the white list. For example, if there are two terms, one can set x=0.9 and x=0.89 (gap of 0.01). However, if there are 80 candidates to a translation found in the white list, one can make the transitions even smaller. A candidate that is not from the white list, but generated by other methods such as some more unreliable translation method (e.g., by using a machine translation) is set to a probability of some prescribed value. Any translated pairs can be added in to the white list in case the corpus does not have pairs, or for any other purpose.

In some map label translation implementations, to compute the translated n-gram sequential probability, P(enToken (I−1)→enToken(i)), of a translation candidate sequence, location-related administrative hierarchy context information with pre-set values of probabilities can be used. Generally, the idea is that more famous locations that match a translation term are assigned higher probabilities.

In order to obtain the translated n-gram sequential probability P(enToken(I−1)→enToken(i)), two probabilities P(Hierarchical Level) and P(Prominence), are multiplied; e.g., P(enToken(I−1)→enToken(i))=P(Hierarchical Level)*P(Prominence).

P(Hierarchical Level) can be preset based on an administrative model that breaks each geographic location into a hierarchy of smaller divisions. In one implementation, these divisions are prefecture, municipality and neighborhood.

P(Prominence) can be a normalized stack rank of all known municipal entities by population count. e.g.,
Municipality1: 0.99,
Municipality2: 0.98 . . .
Municipality1400: 0.0007.

Prominence can be inherited. For example, a neighborhood that does not have a prominence assigned, but belongs to a municipality that has a prominence can be assigned the prominence of the municipality. If there is no prominence information available, a similar but lower prominence is assigned based on the average of adjacent municipalities that exist in the same prefecture (e.g., district) and of the same class.

In some map label translation implementations, the source of the candidate can be used to determine its probability. For example, the word Hilton from the candidate generation was found in the white list, therefore it has a high probability of 0.9. The word Hiruton was generated using a machine translator such as, for example, a Romaji Converter, so its probability is lower. Shinjyuku is the name of a ward in Tokyo, which has a higher prominence than Arajyuku, the name of a neighborhood in Kyusyu region, therefore a probability of 0.8 is assigned for Shinjyuku while a probability of 0.6 is assigned for Arajyuku.

Figure 7:
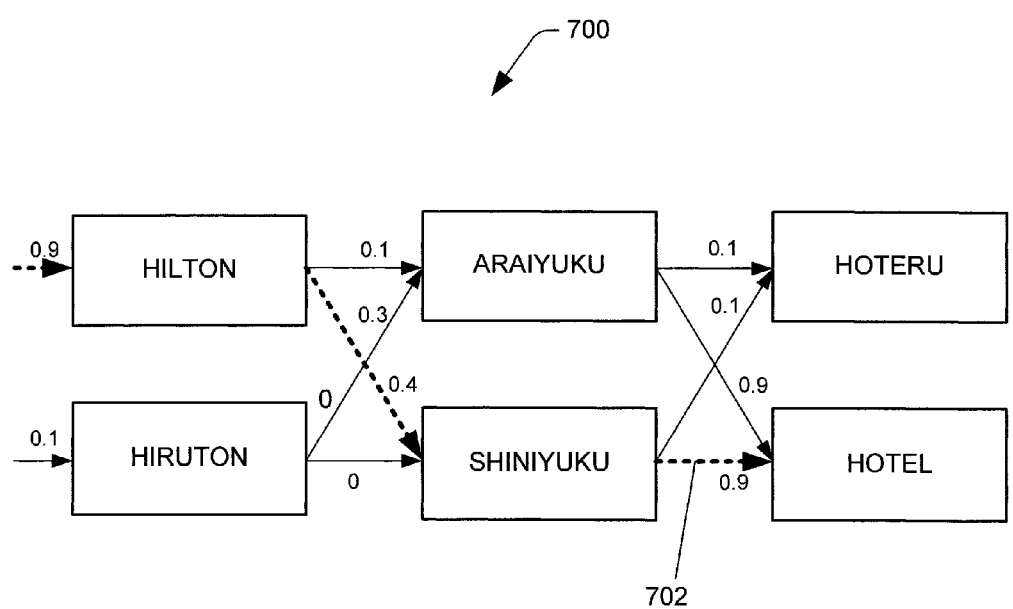
FIG. 7 is an exemplary block diagram of the computation of the transition probability of a set translation candidate sequences.

As discussed above, in determining the transition probabilities of a translation candidate sequence, both P(jaToken (i)→enToken(i) and P(enToken(i−1)→enToken(i)) are taken into account. For example, as shown in FIG. 7, for the first words {Hilton and Hiruton}, there is no transition probability of { }=>{Hilton}, for this P(jaToken(i)→enToken(i) is used. For transitions Hilton=>Shinjyuku and Hilton Arajyuku=>the probability of 0.5 could be assigned. Therefore the final transition probability is 0.5×0.8=0.4. The top x candidates are chosen, as shown in FIG. 7 as an example. For example, continuing with the example above, for x=2:

{Hilton Shinjyuku Hotel}=>(0.9*0.4*0.9)=0.324

{Hilton Arajyuku Hotel}=>(0.9*0.3*0.9)=0.243

The top translation candidate sequence 702 in this example is shown in dashed lines.

2.3.1 Another Way of Pre-Calculating Transition Probabilities

The following provides steps of pre-calculating the probability (P(jaToken(i)→enToken(i))):

1. Choose a translated pair from a set of data such as a training data set.
2. Split a first language (e.g., Japanese) label into unigrams by using a word breaker, or by simply space-delimiting (e.g., for European languages).
3. Enumerate all of the n-grams (n>=1) combination sequences from the unigrams.
4. Split a second language (e.g., English) label to unigrams as well.
5. Align the translated second language's n-grams to each first language n-gram.
6. Repeat step 1-5 for all pairs
7. Calculate the probabilities from firstLangNgram(i) to secondLangNgram(j) from those results. For example, in the case where firstLangNgram(i) is translated into secondLangNgram(j0) 3 times, secondLangNgram(j1) 10 times, secondLangNgram(j2) 7 times, P(firstLangNgram(i)→secondLangNgram(j0))=3/(3+10+7)=0.15. These two probabilities are then multiplied to compute the resulting transition probability for a given translation candidate sequence (e.g., P(Transition(i−1, i))=P(jaToken(i)→enToken(i))*P(enToken(I−1)→enToken(i)).

One implementation for finding the n-gram sequential probability, which in this example is represented by P(secondLangNgram(i)→secondLangNgram(j)) is as follows:

1. Choose a translated second language label from training data set.
2. Split the second language label to unigrams by using a word breaker, or by simply space-delimiting.
3. Enumerate all of n-grams (n>=1) combination sequences from the unigrams
4. Repeat steps 1-3 for all pairs
5. Calculate translated n-gram sequential probabilities, secondLangNgram(i) to secondLangNgram(j) as the next n-gram from those results. For example, in the case where secondLangNgram(i) has secondLangNgram(j0) as the following n-gram 5 times, secondLangNgram(j1) 3 times, secondLangNgram(j2) 2 times, P(secondLangNgram(i)→secondLangNgram(j0))=5/(5+3+2)=0.5.

These two probabilities are then multiplied to compute the resulting transition probability for a given translation candidate sequence (e.g., P(Transition(i−1, i))= P(jaToken(i)→enToken(i))*P(enToken(I−1)→enToken(i)).

2.4 Ranking Using Extracted Features and a Probabilistic Classifier

Map label translation implementations use features based on geospatial and linguistic context to train a probabilistic classifier. Features are extracted from the map label to be translated and the selected translation candidate sequences and input into the trained probabilistic classifier in order to find the best translation candidate sequences. The following paragraphs discuss the classifier training, the classifier ranking and the features used.

To use the probabilistic classifier to rank the selected translation candidate sequences, it must first be trained using the set of features that will be used in the ranking. Some features that are used for this purpose in some implementations will be explained in greater detail below. Training the classifier can be done in a number of conventional ways. In one implementation, however, to train the probabilistic classifier, a training sample is used that represents the inputs and outputs of a truth set, which each represents the expected results of a translation for a given entity in the first language (e.g., Japanese). The training sample can be, for example, 2000 inputs and outputs. The training samples can be the results obtained by asking a human or several humans to label the expected result given an input and the output. In one implementation, the input is represented as a list of input variables [x1, x2, x3, . . . xN] and each variable is a numerical value that is 0 or 1 for a IS or IS NOT a type of feature or that is an arbitrary numerical value such as, for example, the number of Romaji map labels being translated. These numerical values are extracted using information from the map label in the first language and the translation candidates. A process is run that contains rules for each of the features to determine the numerical values. For example, to determine if a map label corresponds to a prominent landmark, this can be determined simply from an existing source, such as, for example, Wikipedia. (It is assumed that the existence of the entity on Wikipedia is a proof of its prominence). For example, in the case of computing prominence (e.g., that the entity exists in an on-line dictionary), if a name in that matches the map label in the first language exists in the on-line dictionary, then the IS value is set to 1, otherwise it is set to 0. In order for humans to label the training data, instead of just the input parameters, the possible translation candidates for the input map label corresponding to an entity are also provided. The output represents the corresponding label that indicates if a transliteration/translation is a likely one. For example, a 5 point label can be chosen, such as Perfect, Excellent, Satisfactory, Poor, Bad, for an input map label corresponding to an entity and its corresponding translation.

Once the probabilistic classifier is trained, an entity's map label in the first language and its selected translation candidate sequences are input and the classifier outputs the ranked translation candidate sequences. Each of these ranked translation candidate sequences is assigned a score. For example, scores can be, perfect 1.0, excellent 0.8, satisfactory 0.5, poor −0.5 and bad −1.0.

2.4.1 Features

The paragraphs below describe some exemplary features that can be used by the probabilistic classifier but they are not exhaustive. The features enable the processing of a large combination of factors that may not be solvable by a rule-based approach.

2.4.1.1 Context of the Administrative or Unofficial Region

The context of the administrative region in which the entity corresponding to the map label is found can be used as a feature. For example, since the place and coordinates of the entity for which the map label translation is sought are known (given a map data source), if there are two exact strings, hypothetically, that were found in Japan, (Hilton Arajyuku Hotel) and (Hilton Shinjyuku Hotel), if the name of one entity exists in Shijyuku ward, some map label translation implementations described herein further boost the score of the translation candidate sequence {Hilton Shinjyuku Hotel}. The other translation candidate sequence's {Hilton Arajyuku Hotel} rank found in the Arajyuku neighborhood in Kyuusyuu will similarly be boosted for the same reason. This will result in the appropriate translation based on the context of the administrative or unofficial region in which the map label for the entity to be translated lies. To find this context, a reverse geo-coding service can be used to pin point the address of the latitude longitude and to determine if the context hierarchy contains 新宿 (Shinjyuku). The context hierarchy would be {Tokyo, Shinjyuku-ku} and {Tokyo, Katsushika-ku,Niijyuku}, in English. In this case the Japanese equivalent is used.

2.4.1.2 Prominent Landmark/Business

The class of an entity, for example if it is a landmark entity or a miscellaneous structure, can have an impact on its translations, and can be used as a feature. For example, a landmark that is more likely to be a tourist attraction or a globally well known structure, is more likely to have a well-known translation. For example, 東京タワー (Tokyo Tower) is a well known landmark. No one would want a translation such as Tokyo Towa, so the Tokyo Tower probability or score output by the probabilistic classifier will be boosted.

2.4.1.3 Well Known Entity Category

Some map label translation implementations determine whether the terms in a translation candidate sequence indicate a well known entity category and use this as a feature. If it is determined that a translation candidate sequence contains a well known entity category its probability or score is boosted. For example, 武蔵野公園 (Musashino Park) is better translated as Musashino Park rather than Musashino Koen in Japanese, since park is such a well known category of entity. Other examples of well known category entities are various levels of schools, office, halls, police stations, fire stations, courts, libraries, museums, aquariums, zoos, amusement parks, gymnasiums, fields, pools, bowling alleys, tennis courts, marinas, ports, airports, factories, hot springs, shrines, temples, and cemeteries.

2.4.1.4 Type of Nature N-Gram

Whether an entity contains a type of nature n-gram can also be used as a feature to determine its translation and can be used as a feature. Natural entities tend to have common prefixes and suffixes such as Riv. (River) or Mt. (Mountain). These can be reflected in the associated probability or score output by the probabilistic classifier for a translation candidate sequence containing a nature n-gram.

2.4.1.5 Type of Entrance N-Gram

Entrance type entities tend to have common patterns for translation, and these can be used as a feature. They boost the score or probability for a translation candidate sequence if a given pattern is found. For example, 入口: entrance, 中央口: central entrance, 出入口: entrance, and [東|東口][西|西口][南| 南口][北|北口] :(east)(west)(south)(north).

2.4.1.6 Company N-Gram

Some map label translation implementations determine whether the terms in a translation candidate sequence indicate a company n-gram (e.g., Corp., Org.) and use this as a feature. If it is determined that a translation candidate sequence contains a well known entity category its probability or score output by the probabilistic classifier is boosted.

2.4.1.7 Numeric N-Grams

Some map label translation implementations determine whether the terms in a translation candidate sequence indicate numeric n-grams and use this as a feature. If it is determined that a translation candidate sequence contains a numeric n-gram assumptions are made as to how it should be translated. For example, [一、二、三・・十 ] should most likely be translated to its Romanized form [1, 2, 3 . . . 10] so the probability or score for the translation candidate sequences that have this form will be boosted.

2.4.1.8 Katakana N-Grams/Katakana N-Gram Proportions

For a Japanese map label, the number of Katakana n-grams and Katakana n-gram proportions can be used as features. From observation, it is known that names in Katakana in Japanese are likely to have a foreign origin. Therefore a name in Katakana is typically a direct translation to its originating English or other European languages and therefore its score or probability is boosted. For example, リバージュグラン comes from French "Le Rivage Gran", therefore if such a sequence of transitions if found it should have a higher score than say "Ribajyu Gran" from other sources. Similarly, the number of Katakana n-grams will suggest how "foreign" the originating word is.

2.4.1.9 Kanji N-Grams/Kanji N-Gram Proportions

For a Japanese map label, the number of Kanji n-grams and Kanji n-gram proportions can be used as features. A word in Kanji or an label having a large proportion of Kanji makes it a high probability that it is of Japanese origin and needs a transliteration closer to Japanese as there is unlikely to be a translated equivalent, or the translation is simply too inappropriate.

2.4.1.10 Hiragana N-Grams/Hiragana N-Gram Proportions

For a Japanese map label, the number of Hirangana n-grams and Hiragana n-gram proportions can be used as features. A word in Japanese consisting of Hiragana may be a simplified version of the word in Kanji since the Kanji can be too obscure to read. This may suggest that transitions that lead to a Hiragana n-gram or having a high Hiragana n-gram proportion may need a Latin transliteration sounding closer to Japanese. The probabilistic classifier will have the tendency to boost those translation candidates that sound more like transliteration, if the originating entity is likely to have a Japanese originating name, that has no known English translation.

2.4.1.11 Number of Romaji Candidates

For an input Japanese map label, the number of transliterated Romaji candidates can also be used as a feature. For example, if the resultant transliterated results have too many tokens (words) in the map label, the result may be hard to read, therefore the feature of the number of Romaji candidates is used. For example, 箱根湯の花 G can be transliterated/translated as Hakone Yunohana Onsen Golf Course, but it turns out that in truth, Hakone Yunohana Golf Course is a better result. The probabilistic classifier will have the tendency to suppress candidate translations that have a high number of Romaji candidates.

2.4.1.11 Proximity to Surrounding Building Pattern

An entity's proximity to a surrounding building pattern can also be used as a feature. Given a known example of an exit name called 港南口 (Truth=Konan Exit) and an untranslated building name called 港南ビル. Assuming these entities are in the same neighborhood, there would be transition probabilities P1=P(Minato Minami=>Building) and P2=P (Konan Building). Since the building is close to the Konan Exit which is known to be the truth of the translation, the score or probability of P2 would be boosted by the probabilistic classifier.

2.5 Post Ranking Method

For performance reasons, it might not be desirable to re-train a probabilistic classifier with new data in case such new data is received. Therefore, some map label translation implementations instead rely on re-ranking a ranked set of translation candidate sequences output by the probabilistic classifier on the fly. This can be done by evaluating various aspects of the ranked translation candidate sequences. The following paragraphs describe various methods of re-ranking the top translation candidate sequences output by the probabilistic classifier by applying a set of rules based on the proximity of other entities to the entity corresponding to the input map label to boost or diminish the score (as output by the probabilistic classifier) associated with the translation candidate sequences.

2.5.1 Re-Ranking by Using the Proximity to Surrounding Buildings of a Similar Numbering Sequence The ranked translation candidate sequences can be re-ranked by using the proximity to surrounding buildings of a similar numbering sequence. For example, in Japanese, given a structure called 第1宮庭マンション. The true translation could be No. 1 Miyaniwa Mansion, but another candidate could be Daiichi Miyaniwa Mansion. There might be other mansions of similar names like 第2宮庭マンション in close proximity to this structure. In this case, it is assumed that 第 x is a "No. x" suffix instead of a unique name Daiichi. (第 - can be read to be the phonetic literal Daiichi). In such a case, the surrounding area (with a threshold of Euclidean distance x m) can be searched for the pattern of 第 x. If found, the candidate which has the "No. x" translation is given a higher ranking score.

Take another example, given a business name known as 第一生命, also known as Daiichi Seimei (a life insurance company). A direct translation, which could be a candidate would end up as Number One Life. (第 - =Number one). The true translation is Daiichi Seimei. In this case, there are no other 第 x buildings around this business. Also, Daiichi Seimei is a famous entity so if it fits within the names database such a unique candidate sequence, the ranking score for Daiichi Seimei would be boosted above every other candidate.

2.5.2 Proximity to Administrative Buildings

The proximity to administrative buildings can also be used to re-rank the ranked list output by the probabilistic classifier. Many public facilities, administrative and government buildings such as city halls, courts, incineration plants are found in proximity to one another. If the translation n-gram sets can be identified, for example by labeling those as having any suffixes or prefixes commonly seen in these types of buildings, these results can be boosted.

2.5.3 Absolute Definitive Fix

For a particular term that was not translated to its expected form, some map label translation implementations overwrite a translated entity by using a pre-defined list. For example, for a "golden" set of entities, those which one absolutely cannot fail in translation (e.g., related to geopolitical aspects, like the Imperial Palace, foreign embassies or religious structures), some implementations overwrite the translation with an entry from the pre-defined list.

3.0 Other Implementations

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the map label translation implementation described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

Various map label translation implementations are by means, systems processes or techniques for translating map labels from a first language to a second language, even if the map labels in the two languages are in different script. As such some map label translation implementations described herein have been observed to improve the speed, efficiency and accuracy of the translation of map labels in a first language (and possibly first script) to a second language (and possibly second script). Additionally, in some map label translation implementations by using machine learning and a probabilistic classifier the computing efficiency to determine the translated map labels is increased and therefore the power consumption is reduced.

As a first example, in various implementations, a process for translating map labels is provided via means, processes or techniques for receiving an entity's map label in a first language that is to be translated into a second language and generating translation candidates for each n-gram in the entity's map label. These translation candidates are used to generate translation candidate sequences for the received map label. In various implementations, a prescribed number of translation candidate sequences are selected. Features are selected from the translation candidate sequences and the entity's map label using geospatial and linguistic context information. A probabilistic classifier trained at least in part with the extracted features is used to rank the selected translation candidate sequences. The ranked translation candidate sequences are then re-ranked using neighboring proximity information of the entity's location to disclose the highest re-ranked translation candidate sequence as the translated map label.

As a second example, in various implementations, the first example is further modified via means, processes or techniques such that each translation candidate sequence comprises a translated term for each n-gram of the map label and a probability of transition.

As a third example, in various implementations, any of the first example and the second example are further modified via means, processes or techniques so that the transition probability for each translated term is pre-calculated.

As a fourth example, in various implementations, the third example is further modified via means, processes or techniques such that a transition probability is pre-calculated by, for each n-gram, multiplying a first language to Roman script translation probability by a transliterated n-gram sequential probability in a second language.

As a fifth example, in various implementations, any of the first example, the second example, the third example, and the fourth example are further modified via means, processes or techniques for using the transition probabilities to rank each of the translation candidate sequences by using the transition probabilities to rank each translation candidate sequence and select the prescribed number of the top ranked translation candidates.

As a sixth example, in various implementations, any of the first example, the second example, the third example, the fourth example, and the fifth example, are further modified via means, processes or techniques by using a Viterbi process to select the prescribed number of translation candidate sequences.

As a seventh example, in various implementations, any of the first example, the second example, the third example, the fourth example, the fifth example, and the sixth example, are further modified via means, processes or techniques in that the receipt map label in the first language is in a non-Latin script.

As an eighth example, in various implementations, any of the first example, the second example, the third example, the fourth example, the fifth example, the sixth example, and the seventh example, are further modified via means, processes or techniques such that the n-grams of the map label are transliterated into Latin script before translation.

As a ninth example, in various implementations, any of the first example, the second example, the third example, the fourth example, the fifth example, the sixth example, the seventh example, and the eighth example are further modified via means, processes or techniques such that the trained probabilistic classifier receives the map label in the first language and outputs the translation candidate sequence in the second language.

As a tenth example, in various implementations, any of the first example, the second example, the third example, the fourth example, the fifth example, the sixth example, the seventh example, the eighth example and the ninth example are further modified via means, processes or techniques for generating the possible translation candidate sequences for each n-gram in the map label by: breaking the map label in the first language into separate n-grams; transliterating each n-gram that is not in Latin script into a phonetic representation in Latin script; translating each n-gram in Latin script into a term in the second language; and creating the possible translation candidate sequences by combining different translated terms for each n-gram in the map label.

As an eleventh example, in various implementations, any of the first example, the second example, the third example, the fourth example, the fifth example, the sixth example, the seventh example, the eighth example, the ninth example and the tenth example are further modified via means, processes or techniques such that one or more n-grams in Latin script are translated by using a white list that has approved translations in the second language for each n-gram in the first language.

As a twelfth example, in various implementations, any of the first example, the second example, the third example, the fourth example, the fifth example, the sixth example, the seventh example, the eighth example, the ninth example, the tenth example and the eleventh example are further modified via means, processes or techniques such that the first language is Japanese and the second language is English.

As a thirteenth example, in various implementations, any of the first example, the second example, the third example, the fourth example, the fifth example, the sixth example, the seventh example, the eighth example, the ninth example, the tenth example, the eleventh example and the twelfth example are further modified via means, processes or techniques such that re-ranking the selected translation candidate sequences use neighboring proximity information further comprises for each translation candidate sequence applying a set of rules based on the proximity of other entities in relation to the entity of the input map label to boost or diminish the ranking score associated with the translation candidate sequence.

As a fourteenth example, in various implementations, a process for translating map labels is provided via means, processes or techniques for translating a map label from a first label to a second language. This can be done by receiving an entity's map label in a first language that is to be translated into a second language and generating translated terms in the second language for constituent parts of the map label in the first language. Translation candidate sequences are generated by using combinations of translated terms for each constituent part of the received map label. A number of the highest interim ranking generated translation candidate sequences are selected by performing an interim ranking of generated translation candidate sequences by using transition probabilities between terms of each translation candidate sequence to determine a resulting transition probability for that translation candidate sequence. Features are extracted from the entity's map label in the first language and the number of generated highest interim ranking translation candidate sequences by using geospatial and linguistic context information. The extracted features and a trained classifier trained at least in part with the extracted features are used for re-ranking the interim ranking of the translation candidate sequences. A post-ranking of the re-ranked top translation candidate sequences is then performed using neighboring proximity information to disclose the highest ranking sequence as the translated map label.

As a fifteenth example, in various implementations, the fourteenth example, is further modified via means, processes or techniques so that the extracted features comprise at least one of: the geographic context of the region in which the entity is located; or the prominence of the entity; or whether or not the entity falls into a well known category; or whether or not the entity contains a type of nature constituent part; or whether or not the entity contains a type of entrance constituent part; or whether or not the entity contains a company or organizational constituent part; or whether or not the entity contains a numeric constituent part; or the proportion of the constituent parts that are in a non-Latin script; or the proximity to surrounding building patterns.

As a sixteenth example, in various implementations, a system is provided via means, processes or techniques for translating a map label from a first label to a second language. This can be done by a processor and a memory that includes a word breaker, a translation candidate generator, a translation candidate sequence selector, a feature extractor, a candidate sequence re-ranker and a post ranker. The word breaker receives an entity's map label in a first language that is to be translated into a second language and breaks the map label into constituent parts. The translation candidate generator generates translation candidates for each constituent part in the entity's map label and uses these translation candidates to generate translation candidate sequences for the map label. The candidate sequence selector selects a number of highest interim ranking translation candidate sequences by using transition probabilities between terms in each of the translation candidate sequences. The feature extractor extracts features from the highest interim ranking translation candidate sequences and the entity's map label by using geospatial and linguistic context information. The candidate sequence re-ranker uses the extracted features to re-rank the highest interim ranking translation candidate sequences using a probabilistic classifier trained at least in part using the extracted features, wherein each translation candidate sequence is assigned a ranking score. The post ranker re-ranks the re-ranked translation candidate sequences by using rules based on the map labels of entities in the neighboring proximity of the received entity's map label location.

As a seventeenth example, in various implementations, the sixteenth example, is further modified via means, processes or techniques to use the extracted features to adjust the ranking score in the highest interim ranking translation candidates by the post ranker receiving the interim ranking of the translation candidate sequences, and for each translation candidate sequence applying a set of rules based on the proximity of other entities in relation to the entity of the input map label to boost or diminish the ranking score associated with the translation candidate sequence.

As an eighteenth example, the seventeenth example is modified. so that the rules are based on the proximity of the entity associated with the input label to buildings with a similar numbering sequence and/or the proximity of the entity associated with the input label to administrative buildings.

As a nineteenth example, in various implementations, the seventeenth example is further modified via means, processes or techniques so that the rules specify overwriting a translated map label with a label from a pre-defined list.

As a twentieth example, in various implementations, any of the sixteenth example, seventeenth example, eighteenth example, and the nineteenth example are further modified via means, processes or techniques such that the map label in the first language is in non-Latin script and the translated map label in the second language is in Latin script.

Figure 8:
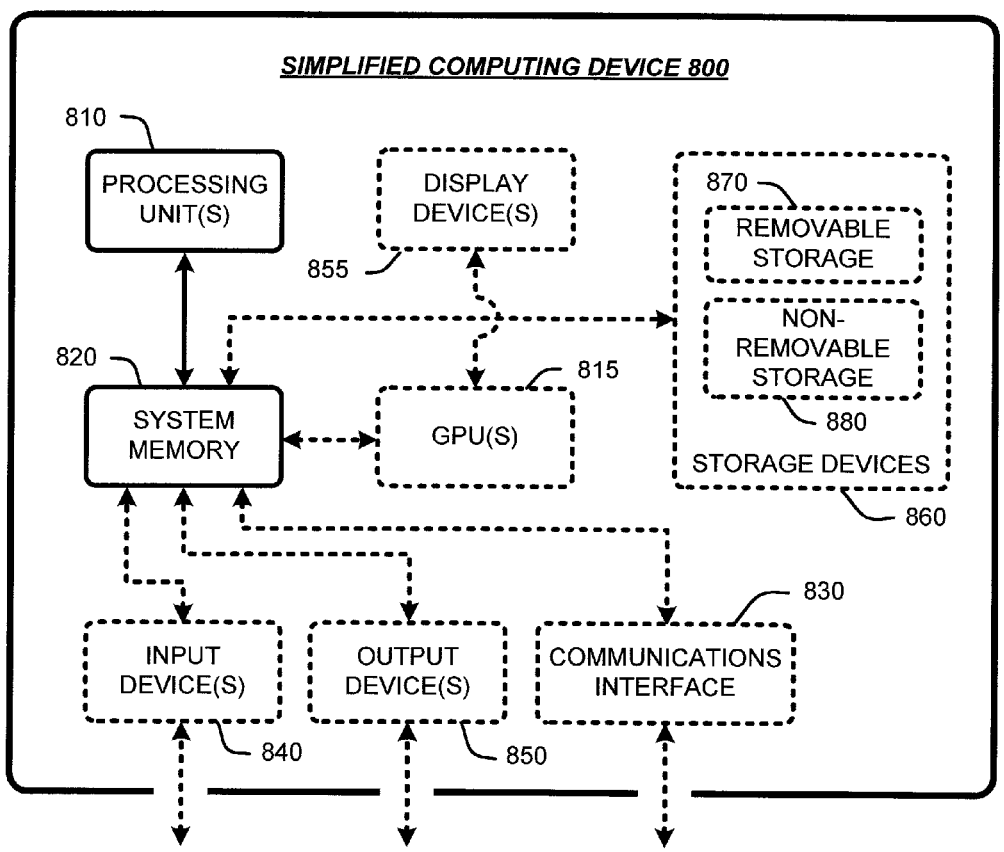
FIG. 8 is an exemplary computing system that can be used to practice exemplary map label translation implementations described herein.

4.0 Exemplary Operating Environment:

The map label translation implementations described herein are operational within numerous types of general purpose or special purpose computing system environments or configurations. FIG. 8 illustrates a simplified example of a general-purpose computer system on which various implementations and elements of the privacy-preserving energy-efficient parametric speaker, as described herein, may be implemented. It is noted that any boxes that are represented by broken or dashed lines in the simplified computing device 800 shown in FIG. 8 represent alternate implementations of the simplified computing device. As described below, any or all of these alternate implementations may be used in combination with other alternate implementations that are described throughout this document.

The simplified computing device 800 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the map label translation implementations described herein, the device should have a sufficient computational capability and system memory to enable basic computational operations. In particular, the computational capability of the simplified computing device 800 shown in FIG. 8 is generally illustrated by one or more processing unit(s) 810, and may also include one or more graphics processing units (GPUs) 815, either or both in communication with system memory 820. Note that that the processing unit(s) 810 of the simplified computing device 800 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 800 may also include other components, such as, for example, a communications interface 830. The simplified computing device 800 may also include one or more conventional computer input devices 840 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 800 and with any other component or feature of the map label translation implementation, including input, output, control, feedback, and response to one or more users or other devices or systems associated with the map label translation implementation, are enabled by a variety of Natural User Interface (NUI) scenarios. The NUI techniques and scenarios enabled by the map label translation implementation include, but are not limited to, interface technologies that allow one or more users user to interact with the map label translation implementation in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 840 or system sensors 805. Such NUI implementations are also enabled by the use of various techniques including, but not limited to, information derived from system sensors 805 or other input devices 840 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the map label translation implementation.

However, it should be understood that the aforementioned exemplary NUI scenarios may be further augmented by combining the use of artificial constraints or additional signals with any combination of NUI inputs. Such artificial constraints or additional signals may be imposed or generated by input devices 540 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the map label translation implementation.

The simplified computing device 800 may also include other optional components such as one or more conventional computer output devices 850 (e.g., display device(s) 855, audio output devices, video output devices, devices for transmitting wired or wireless data transmissions, and the like). Note that typical communications interfaces 830, input devices 840, output devices 850, and storage devices 860 for general-purpose computers are well known to those skilled in the art, and will not be described in detail herein.

The simplified computing device 800 shown in FIG. 8 may also include a variety of computer-readable media. Computer-readable media can be any available media that can be accessed by the computing device 800 via storage devices 860, and include both volatile and nonvolatile media that is either removable 870 and/or non-removable 880, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various map label translation implementation implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 525, hardware, or any combination thereof to control a computer to implement the disclosed subject matter. The term "article of manufacture" as used herein is intended to encompass a computer program accessible from any computer-readable device, or media.

The map label translation implementations described herein may be further described in the general context of computer-executable instructions, such as program modules, being executed by a computing device. Generally, program modules include routines, programs, objects, components, data structures, and the like, that perform particular tasks or implement particular abstract data types. The map label translation implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

The foregoing description of the map label translation implementation has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate implementations may be used in any combination desired to form additional hybrid implementations of the map label translation implementation. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A computer-implemented process for translating map labels, comprising using a computing device for:
    receiving an entity's map label in a first language that is to be translated into a second language;
    generating translation candidates for each n-gram in the entity's map label and using these translation candidates to generate translation candidate sequences for the map label;
    selecting a prescribed number of translation candidate sequences;
    extracting features from the selected translation candidate sequences and the entity's map label by using geospatial and linguistic context information;
    using a probabilistic classifier trained at least in part with the extracted features to rank the selected translation candidate sequences; and
    re-ranking the selected translation candidate sequences using neighboring proximity information of the entity's location to disclose the highest re-ranked translation candidate sequence as the translated map label.

2. The computer-implemented process of claim 1 wherein each translation candidate sequence comprises a translated term for each n-gram of the map label and a probability of transition.

3. The computer-implemented process of claim 2 wherein the transition probability for each translated term to another is pre-calculated.

4. The computer-implemented process of claim 3 wherein the transition probability is pre-calculated by, for each n-gram:
    multiplying a first language to Roman script translation probability by a transliterated n-gram sequential probability in the second language.

5. The computer-implemented process of claim 1, further comprising selecting the prescribed number of translation candidate sequences by:
    using the transition probabilities to rank each translation candidate sequence; and
    selecting the prescribed number of the top ranked translation candidate sequences.

6. The computer-implemented process of claim 1 wherein a Viterbi process is used to select the prescribed number of translation candidate sequences.

7. The computer-implemented process of claim 1 wherein the received map label in the first language is in a non-Latin script.

8. The computer-implemented process of claim 7 wherein n-grams of the map label are transliterated into Latin-script before translation.

9. The computer-implemented process of claim 1 wherein the trained probabilistic classifier receives the map label in the first language and outputs the translation candidate sequences in the second language.

10. The computer-implemented process of claim 1 wherein generating the possible translation candidate sequences for each n-gram in the map label comprises:
    breaking the map label in the first language into separate n-grams;
    transliterating each n-gram that is not in Latin script into a phonetic representation in Latin script;
    translating each n-gram in a Latin script into a term in the second language; and
    creating the possible translation candidate sequences by combining different translated terms for each n-gram in the map label.

11. The computer-implemented process of claim 10 wherein one or more n-grams in Latin script are translated by using a white list that has approved translations in the second language for each n-gram in the first language.

12. The computer-implemented process of claim 1 wherein the first language is Japanese and the second language is English.

13. The computer-implemented process of claim 1 wherein re-ranking the selected translation candidate sequences using neighboring proximity information of the entity's location further comprises:
    for each translation candidate sequence applying a set of rules based on the proximity of other entities in relation to the entity of the input map label to boost or diminish the ranking score associated with the translation candidate sequence.

14. A computer-implemented process for translating a map label from a first language to a second language, comprising:
    receiving an entity's map label in a first language that is to be translated into a second language;
    generating translated terms in the second language for constituent parts of the map label in the first language;
    generating translation candidate sequences by using combinations of translated terms for each constituent part of the received map label;
    selecting a number of the highest interim ranking generated translation candidate sequences by performing an interim ranking of generated translation candidate sequences by using transition probabilities between terms of each translation candidate sequence to determine a resulting transition probability for that translation candidate sequence;
    extracting features from the entity's map label in the first language and the number of generated highest interim ranking translation candidate sequences by using geospatial and linguistic context information;

using the extracted features and a trained classifier trained at least in part with the extracted features re-ranking the interim ranking of the translation candidate sequences; and post-ranking re-ranked top translation candidate sequences using neighboring proximity information to disclose the highest ranking sequence as the translated map label.

15. The computer-implemented process of claim 14 wherein the extracted features comprise at least one of:

the geographic context of the region in which the entity is located; or the prominence of the entity; or whether or not the entity falls into a well known category; or whether or not the entity contains a type of nature constituent part; or whether or not the entity contains a type of entrance constituent part; or whether or not the entity contains a company or organizational constituent part; or whether or not the entity contains a numeric constituent part; or the proportion of the constituent parts that are in a non-Latin script; or the proximity to surrounding building patterns.

16. A system comprising:

a processor; and a memory, the memory including a word breaker, a translation candidate generator, a translation candidate sequence selector, a feature extractor, a candidate sequence re-ranker and a post ranker, wherein:

the word breaker receives an entity's map label in a first language that is to be translated into a second language and breaks the map label into constituent parts;

the translation candidate generator generates translation candidates for each constituent part in the entity's map label and uses these translation candidates to generate translation candidate sequences for the map label;

the candidate sequence selector selects a number of highest interim ranking translation candidate sequences by using transition probabilities between terms in each of the translation candidate sequences;

the feature extractor extracts features from the highest interim ranking translation candidate sequences and the entity's map label by using geospatial and linguistic context information;

the candidate sequence re-ranker uses the extracted features to re-rank the highest interim ranking translation candidate sequences using a probabilistic classifier trained at least in part using the extracted features, wherein each translation candidate sequence is assigned a ranking score; and the post ranker re-ranks the re-ranked translation candidate sequences by using rules based on the map labels of entities in the neighboring proximity of the received entity's map label location.

17. The system of claim 16 wherein the translation candidate sequence post ranker uses the extracted features to adjust the ranking score in the highest interim ranking translation candidate sequences by:

receiving the interim ranking of the translation candidate sequences;

for each translation candidate sequence applying a set of rules based on the proximity of other entities in relation to the entity of the input map label to boost or diminish the ranking score associated with the translation candidate sequence.

18. The system of claim 17 wherein the set of rules are based on at least one of the following:

the proximity of the entity associated with the input label to buildings with a similar numbering sequence;

the proximity of the entity associated with the input label to administrative buildings.

19. The system of claim 17 wherein the set of rules further comprise overwriting a translated map label with a label from a pre-defined list.

20. The system of claim 16 wherein the map label in the first language is in non-Latin script and wherein the translated map label in the second language is in Latin script.

* * * * *